(12) United States Patent
Koharagi et al.

(10) Patent No.: US 6,441,523 B1
(45) Date of Patent: Aug. 27, 2002

(54) VERY HIGH PERMANENT MAGNET TYPE ELECTRIC ROTATING MACHINE SYSTEM

(75) Inventors: Haruo Koharagi, Juou; Tsunehiro Endou, Hitachiota; Tsukasa Taniguchi, Hitachi; Kouki Yamamoto, Hitachinaka; Satoshi Kikuchi; Miyoshi Takahashi, both of Hitachi; Haruo Miura, Chiyoda; Yasuo Fukushima, Moriya, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/654,091

(22) Filed: Sep. 1, 2000

(30) Foreign Application Priority Data

Nov. 25, 1999 (JP) .......................................... 11-334050

(51) Int. Cl.$^7$ ................................................ H02K 1/27
(52) U.S. Cl. ............................ 310/156.28; 310/156.53; 310/261
(58) Field of Search ........................ 310/156.28, 156.53, 310/51, 261; 318/737

(56) References Cited

U.S. PATENT DOCUMENTS

| 4,115,726 | A |   | 9/1978  | Patterson et al. | ........... 318/171 |
| 4,623,830 | A |   | 11/1986 | Peneder et al.   | ............. 318/798 |
| 5,189,357 | A |   | 2/1993  | Woodson et al.   | ........... 318/737 |
| 6,034,460 | A | * | 3/2000  | Tajima et al.    | ................ 310/179 |
| 6,047,461 | A | * | 4/2000  | Miura et al.     | .................. 29/598 |

FOREIGN PATENT DOCUMENTS

| EP | WO 99/63654 | 9/1999 |
| EP | WO 00/14864 | 3/2000 |
| JP | 10-243586   | 9/1998 |

OTHER PUBLICATIONS

11–34864 Japanese Abstract Only Dec. 1999.

* cited by examiner

Primary Examiner—Karl Tamai
(74) Attorney, Agent, or Firm—Antonelli, Terry, Stout & Kraus, LLP

(57) ABSTRACT

A very high speed permanent magnet type electric rotating machine, in which loss generated on a rotor is small to achieve high efficiency on an air generating source even when driven by an inverter operating at a fundamental frequency of at least several hundreds of Hz and in which a reactor is inserted between the inverter and a permanent magnet type synchronous motor, and content percentages of components of harmonic current supplied to the permanent magnet type synchronous motor are adjusted such that when a content percentage of a fundamental wave is 100%, a content percentage B of a seventh order component is at most 10% and a total content percentage is made equal to or less than a certain value so as to satisfy the relationship (A<C<B) where A is a content percentage of a fifth order component, B is a content percentage of a seventh order component thereof, and C is a content percentage of a ninth order component thereof, thereby enabling realizing a very high speed permanent magnet type electric rotating machine system, in which harmonic loss of neodymium magnets as well as harmonic loss of a shaft is greatly reduced and loss of the rotor can be reduced to several hundreds of W.

8 Claims, 6 Drawing Sheets

VERY HIGH PERMANENT MAGNET TYPE ELECTRIC ROTATING MACHINE SYSTEM

BACKGROUND OF THE INVENTION

The invention relates to a very high speed type variable speed motor drive system for driving an air compressor or the like, and, more particular, to an air generating source using a very high speed permanent magnet type electric rotating machine system.

RELATED ART

Permanent magnet type synchronous motors have been frequently used, by virtue of their high electric motor efficiency, for industrial drive sources. In the case of motors having low speeds, permanent magnets are attached to a shaft in use, but in the case of motors having high speeds, there is the possibility that permanent magnets are scattered.

As a measure of solving the above-mentioned disadvantage, Japanese Patent Unexamined Publication No. H10-243586 discloses an arrangement of carbon fibers or a titanium ring on an outer periphery of a permanent magnet in very high speed permanent magnet type synchronous motors.

The above-mentioned prior art involves a problem that while a permanent magnet can be prevented from scattering, no consideration is taken of loss generated in a rotor when a permanent magnet type synchronous motor is driven by an inverter and pulsating magnetic flux caused by harmonic current is made to enter the rotor. Further, the prior art does not take consideration of the function of an air generating source drive system when a very high speed permanent magnet type synchronous motor is used for air generation.

SUMMARY OF THE INVENTION

It is an object of the invention is to provide a very high speed permanent magnet type electric rotating machine system, in which loss caused in a rotor is small even when driven by an inverter acting at a fundamental frequency of at least several hundred Hz, and so it is possible to achieve high efficiency of an air generating source, and an air generating source using the above-mentioned very high speed permanent magnet type electric rotating machine.

In a first aspect of the invention, there is provided a very high speed permanent magnet type electric rotating machine system comprising a permanent magnet type synchronous motor including a stator having armature windings wound in a plurality of slots formed in a stator core, and a rotor including a conductive permanent magnet provided on an outer periphery of a shaft made of a conductive magnetic material and a reinforcement material made of carbon fibers and provided on an outer periphery of the permanent magnet, and an inverter for driving the permanent magnet type synchronous motor, the improvement comprising an electromagnetic steel sheet ring provided on the outer periphery of the shaft of the rotor, and an reactor interposed between the inverter and the permanent magnet type synchronous motor, and wherein content percentages of components of harmonic current supplied to the permanent magnet type synchronous motor from the inverter are such that when a content percentage of a fundamental wave is 100%, a content percentage B of a seventh order component is at most 10% and the relationship (A<C<B) is satisfied where A is a content rata of a fifth order component and C is a content percentage of an eleventh order component.

In a second aspect of the invention, there is provided a very high speed permanent magnet type electric rotating machine system comprising a permanent magnet type synchronous motor including a stator having armature windings wound in a plurality of slots formed in a stator core, and a rotor including a conductive permanent magnet provided on an outer periphery of a shaft made of a conductive magnetic material and a reinforcement material made of carbon fibers and provided on an outer periphery of the permanent magnet, and an inverter for driving the permanent magnet type synchronous motor, the improvement comprising an electromagnetic steel sheet ring provided on the outer periphery of the shaft of the rotor, and an reactor interposed between the inverter and the permanent magnet type synchronous motor, and wherein content percentages of components of harmonic current supplied to the permanent magnet type synchronous motor from the inverter are such that when a content percentage of a fundamental wave is 100%, a total content percentage calculated by the formula $(A^2+B^2+C^2+D^2+E^2+F^2)^{0.5}$ is at most 11% where A is a content percentage of a fifth order component, B is a content percentage of a seventh order component, C is a content percentage of an eleventh order component, D is a content percentage of a thirteenth order component, E is a content percentage of a seventeenth order component, and F is a content percentage of a nineteenth order component.

In a third aspect of the invention, the very high speed permanent magnet type electric rotating machine system in the first or second aspect of the invention is such that the electromagnetic steel sheet ring is made of a high tensile strength electromagnetic steel sheet, of which tensile strength is at least 70 kg/mm$^2$.

In a fourth aspect of the invention, there is provided a very high speed permanent magnet type electric rotating machine system comprising a permanent magnet type synchronous motor including a stator having armature windings wound in a plurality of slots formed in a stator core, and a rotor including an electromagnetic steel sheet ring provided on an outer periphery of a shaft made of a conductive magnetic material, and conductive permanent magnets inserted into permanent magnet insertion holes in the electromagnetic steel sheet ring, and an inverter for driving the permanent magnet type synchronous motor, the improvement comprising an reactor interposed between the inverter and the permanent magnet type synchronous motor, and wherein content percentages of components of harmonic current supplied to the permanent magnet type synchronous motor from the inverter are such that when a content percentage of a fundamental wave is 100%, a total content percentage calculated by the formula $(A^2+B^2+C^2+D^2+E^2+F^2)^{0.5}$ is at most 14% where A is a content percentage of a fifth order component, B is a content percentage of a seventh order component, C is a content percentage of an eleventh order component, D is a content percentage of a thirteenth order component, E is a content percentage of a seventeenth order component, and F is a content percentage of a nineteenth order component.

In a fifth aspect of the invention, the very high speed permanent magnet type electric rotating machine system of the fifth aspect of the invention is such that the electromagnetic steel sheet ring is made of a high tensile strength electromagnetic steel sheet, of which tensile strength is at least 80 kg/mm$^2$.

In a sixth aspect of the invention, the very high speed permanent magnet type electric rotating machine system of one of the first to fifth aspects of the invention is used for an air generating source.

That is, magnetic flux of the permanent magnet is conducted to the stator through the shaft of the rotor and a CFRP. Further, when the permanent magnet type motor is driven by an inverter operating at a fundamental frequency of at least several hundreds of HZ, harmonic magnetic flux is induced due to harmonic current supplied from the inverter. Influential orders of the harmonic current are 5, 7, 11, 13, 17 and 19 times as high as that of the fundamental frequency, which will generate harmonic losses on the constituent members. As a result of various experiments, it was found that a highest harmonic loss was generated on the shaft to amount to as high as several kW, which does not make any very high speed permanent magnet type synchronous motor practical.

However, with the very high speed permanent magnet type electric rotating machine system according to the first aspect of the invention, the electromagnetic steel sheet ring made of a magnetic material is provided on the outer periphery of the shaft of the rotor, the reactor is inserted between the inverter and the permanent magnet type synchronous motor, and content percentages of components of harmonic current supplied to the permanent magnet type synchronous motor are adjusted such that when a content percentage of a fundamental wave is 100%, a content percentage B of a seventh order component is at most 10% and a total content percentage is made equal to or less than a certain value so as to satisfy the relationship (A<C<B) where A is a content percentage of a fifth order component, B is a content percentage of a seventh order component thereof, and C is a content percentage of a ninth order component thereof, thereby enabling realizing a very high speed permanent magnet type electric rotating machine system, in which harmonic loss of neodymium magnets as well as harmonic loss of the shaft is greatly reduced and loss of the rotor can be reduced to several hundreds of W.

Further, with the very high speed permanent magnet type electric rotating machine system according to the second aspect of the invention, the electromagnetic steel sheet ring made of a magnetic material is provided on the outer periphery of the shaft of the rotor, the reactor is inserted between the inverter and the permanent magnet, and content percentages of components of harmonic current supplied to the permanent magnet type synchronous motor from the inverter are adjusted such that when a content percentage of a fundamental wave is 100%, a total content percentage calculated by the formula $(A^2+B^2+C^2+D^2+E^2+F^2)^{0.5}$ becomes at most 11% where A is a content percentage of a fifth order component, B is a content percentage of a seventh order component, C is a content percentage of an eleventh order component, D is a content percentage of a thirteenth order component, E is a content percentage of a seventeenth order component, and F is a content percentage of a nineteenth order component, thereby enabling realizing a very high speed permanent magnet type electric rotating machine system, in which harmonic loss of neodymium magnets as well as harmonic loss of the shaft is greatly reduced and loss of the rotor can be reduced to several hundreds of W. Further, the above-mentioned adjustment is effected such that the reactor is adjusted to a value in the range of from 0.2 to 0.1 Ω so as to make the total content percentage equal to or less than 11%.

With the very high speed permanent magnet type electric rotating machine system according to the third aspect of the invention, the rotor according to the first or second aspect of the invention is employed and a high tensile strength electromagnetic steel sheet is used to form the electromagnetic steel sheet ring of magnetic materials and provided on the outer periphery of the shaft, whereby the rotor can be rotated at very high speeds.

With the very high speed permanent magnet type electric rotating machine system according to the fourth aspect of the invention, the electromagnetic steel sheet ring is provided on the outer periphery of the shaft, the permanent magnets are inserted in the permanent magnet insertion holes in the electromagnetic steel sheet ring, the reactor is inserted between the inverter and the permanent magnet type synchronous motor, and content percentages of components of harmonic current supplied to the permanent magnet type synchronous motor from the inverter are adjusted such that when a content percentage of a fundamental wave is 100%, a total content percentage calculated by the formula $(A^2+B^2+C^2+D^2+E^2+F^2)^{0.5}$ becomes at most 14% where A is a content percentage of a fifth order component, B is a content percentage of a seventh order component, C is a content percentage of an eleventh order component, D is a content percentage of a thirteenth order component, E is a content percentage of a seventeenth order component, and F is a content percentage of a nineteenth order component, thereby enabling realizing a very high speed permanent magnet type electric rotating machine system, in which harmonic loss of neodymium magnets as well as harmonic loss of the shaft is greatly reduced and loss of the rotor can be reduced to several hundreds of W.

Further, with the very high speed permanent magnet type electric rotating machine system according to the fifth aspect of the invention, the electromagnetic steel sheet ring is made of a high tensile strength electromagnetic steel sheet, of which tensile strength is at least 80 kg/mm².

With the air generating source using the very high speed permanent magnet type electric rotating machine system, according to the sixth aspect of the invention, the very high speed permanent magnet type electric rotating machine system is enhanced in efficiency, so that an air generating source can be provided, which generates a high output with the same input.

BRIEF DESCRIPTION OF THE DRAWINGS

These and other features and advantages of the invention will become apparent from the following detailed description of preferred embodiments of the invention with reference to the accompanying drawings in which.

DESCRIPTION OF THE PREFERRED EMBODIMENTS

Figure 1:
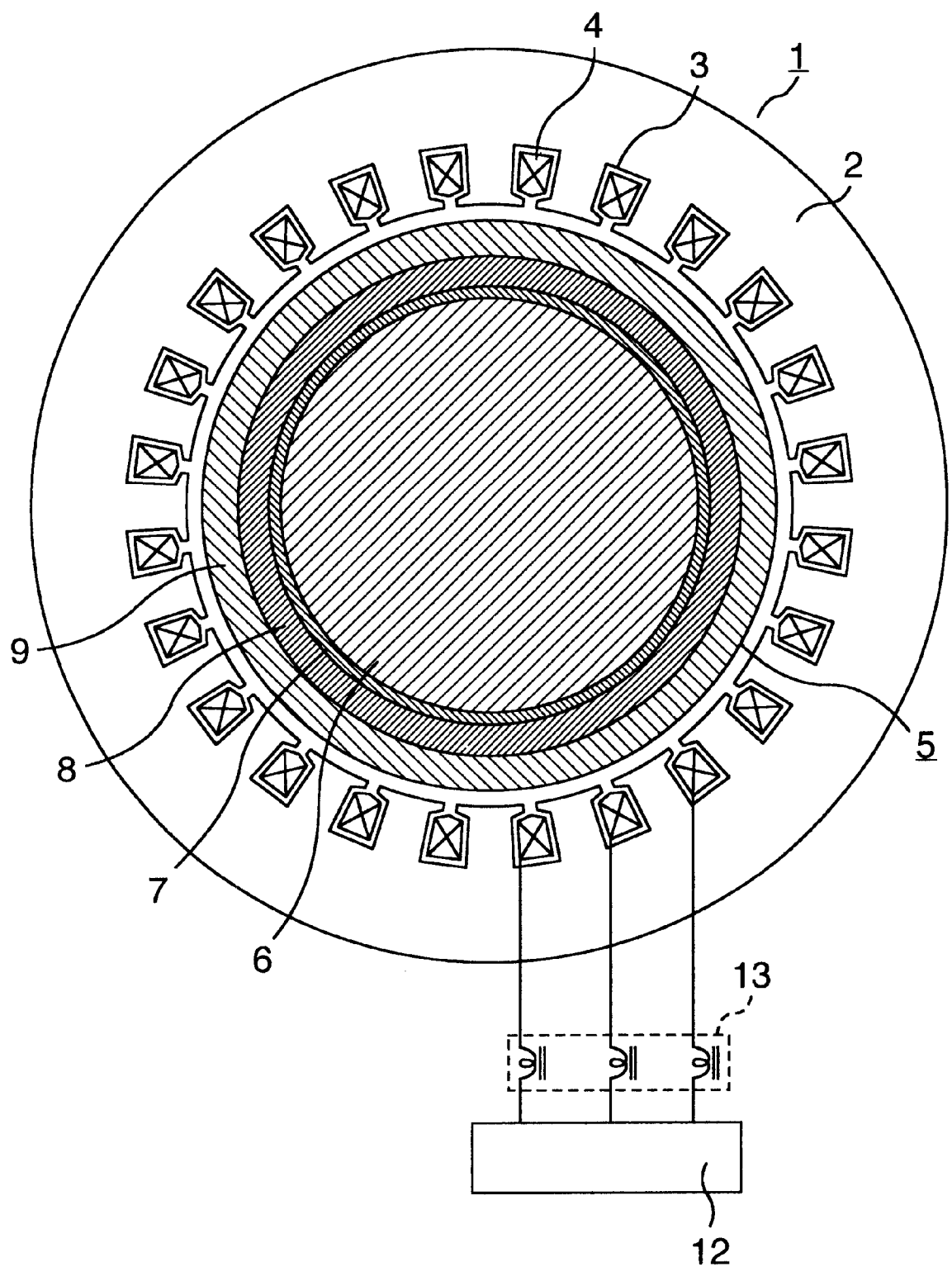
FIG. 1 is a radial, cross sectional view illustrating a permanent magnet type synchronous motor according to a first embodiment of the invention.
Figure 2:
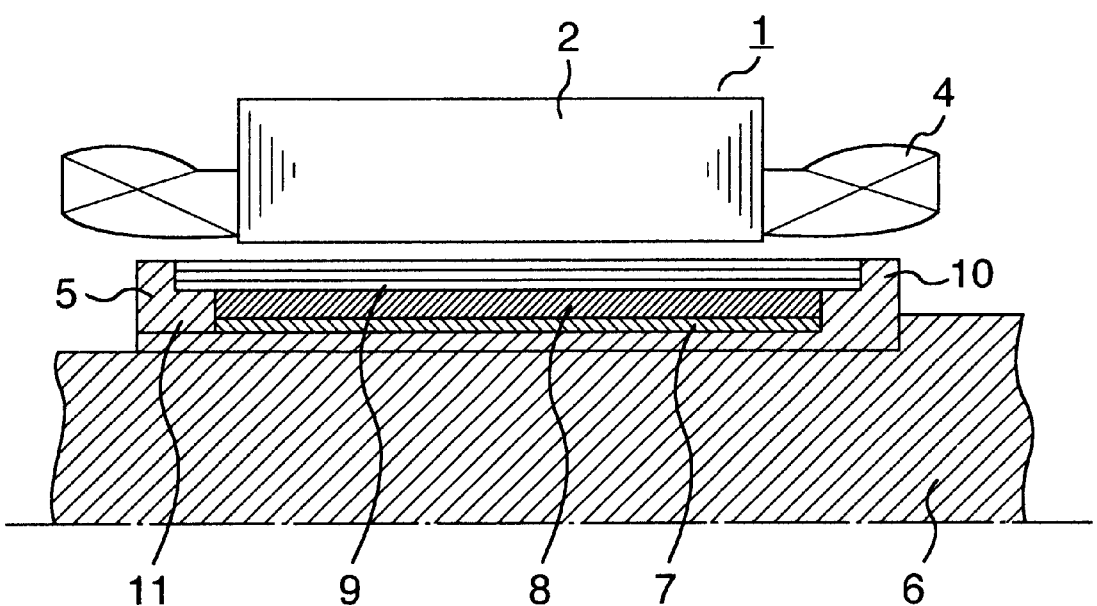
FIG. 2 is an axial, cross sectional view illustrating the permanent magnet type synchronous motor shown in FIG. 1.

FIG. 1 is a radial, cross sectional view illustrating a permanent magnet type synchronous motor according to a first embodiment of the invention, and FIG. 2 is an axial, cross sectional view illustrating the permanent magnet type synchronous motor shown in FIG. 1. In the drawings, a stator 1 is composed of a stator core 2, and three phase U, V, W armature windings 4 wound in a plurality of slots 3 formed in the stator core 2. A rotor 5 is composed of an intermediate sleeve 10 fitted onto a shaft 6 made of a conductive, magnetic material, the sleeve being made of the same material as that of the shaft, an electromagnetic steel sheet ring 7 formed of a laminated electromagnetic steel sheet and provided on an outer periphery of the intermediate sleeve 7, a conductive permanent magnet 8 provided on an outer periphery of the electromagnetic steel sheet ring 7 and a CFRP 9 of a reinforcement made of conductive carbon fibers and provided on the magnet 8.

The rotor 5 is mounted on the shaft 6 after it is formed by arranging and assembling the electromagnet steel sheet ring 7, the permanent magnet 8, and the CFR 9 in this order on an outer periphery of the intermediate sleeve 10, securing these parts to an end of the intermediate sleeve 10 with the use of a sealing material 11, and then magnetizing the permanent magnet 8. The permanent magnet type synchronous motor composed of the stator 1 and the rotor 5 is drivingly rotated by supplying current to a reactor 13 from an inverter 12 in accordance with position of magnetic poles of the permanent magnet 8.

Here, harmonic current from the inverter 12 becomes a problem. The permanent magnet type synchronous motor, at which the invention aims, is a very high speed machine rotated at a rotational speed of at least 40,000 rpm to drive an impeller of an air compressor. In view of frequency, at which the inverter is driven, it results that an associated motor must be a bipolar machine. Accordingly, the drive frequency becomes at least 667 Hz. Since current from the inverter driven at least 667 Hz is adjusted in applied voltage adjustment through PWM (pulse width modulation), high harmonics superpose one another such that upon frequency analysis high harmonics, which are five, seven, eleven, thirteen and nineteen times as high as a fundamental frequency, superpose one another.

Figure 3:
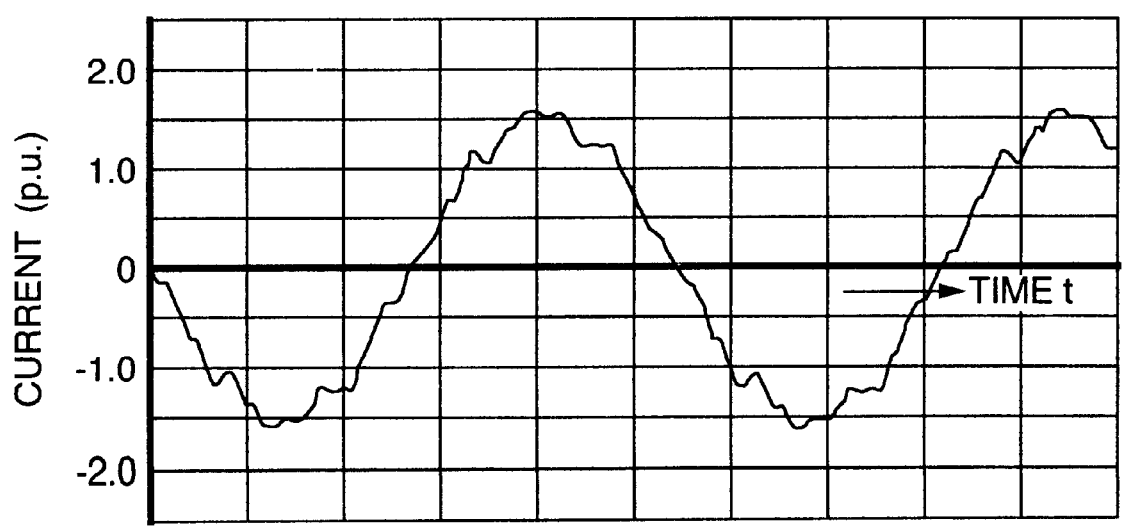
FIG. 3 is a view illustrating a current waveform when an inverter according to an embodiment of the invention shown in FIG. 1 is operated.
Figure 4:
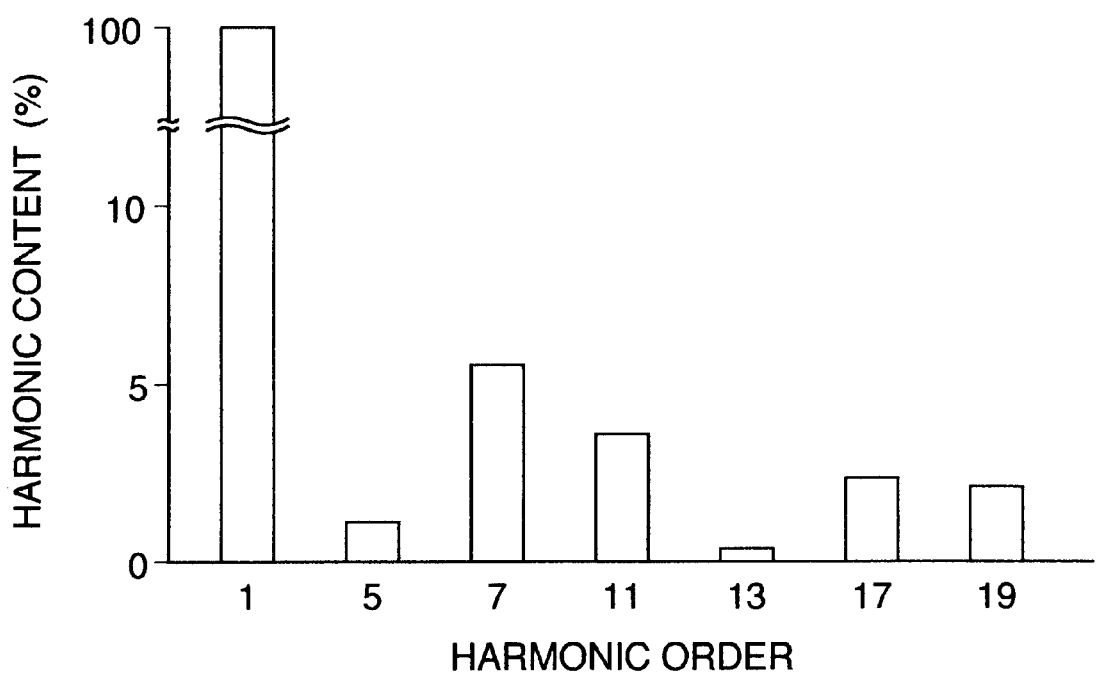
FIG. 4 is a view illustrating relative harmonic content of current in the embodiment of the invention.

As an example, FIG. 3 shows a current waveform when an inverter according to an embodiment of the invention shown in FIG. 1 is operated, and FIG. 4 shows relative harmonic content of current in the embodiment of the invention. Referring to FIGS. 3 and 4, in the case where the rotational speed is adjusted by a voltage type inverter, applied voltage is adjusted through PWM, so that the resulting harmonic wave becomes one, which high harmonics other than the fundamental wave superpose one another to distort. Upon frequency analysis, high harmonics having a fifth order, a seventh order, an eleventh order, a thirteenth order, a seventeenth order and a nineteenth order, which correspond to five, seven, nine, eleven, thirteen and nineteen times as high as the fundamental wave frequency of a first order, superpose one another.

Since current components having these odd orders are not in synchronism with the rotational frequency, magnetic flux of high harmonics enters the rotor. Since the rotor includes the permanent magnet and the shaft (as well, the intermediate sleeve) which are conductive, eddy current runs in such a manner as to cancel the high harmonic flux, and accordingly, eddy current loss is caused. The total eddy current loss of the rotor includes added eddy current losses caused by the harmonic components, and amounts even to 5 kW as measured with a rotor having an output of 180 kW, so that it is not possible to realize a very high speed permanent magnet type synchronous motor. That is, loss raises a magnet in temperature to decrease the effective magnetic flux, which will make it impossible to obtain a desired output. Various experiments have revealed that a permanent magnet shares 10% of loss caused by harmonic magnetic flux, and the intermediate sleeve 10 shares 90% thereof.

Figure 5:
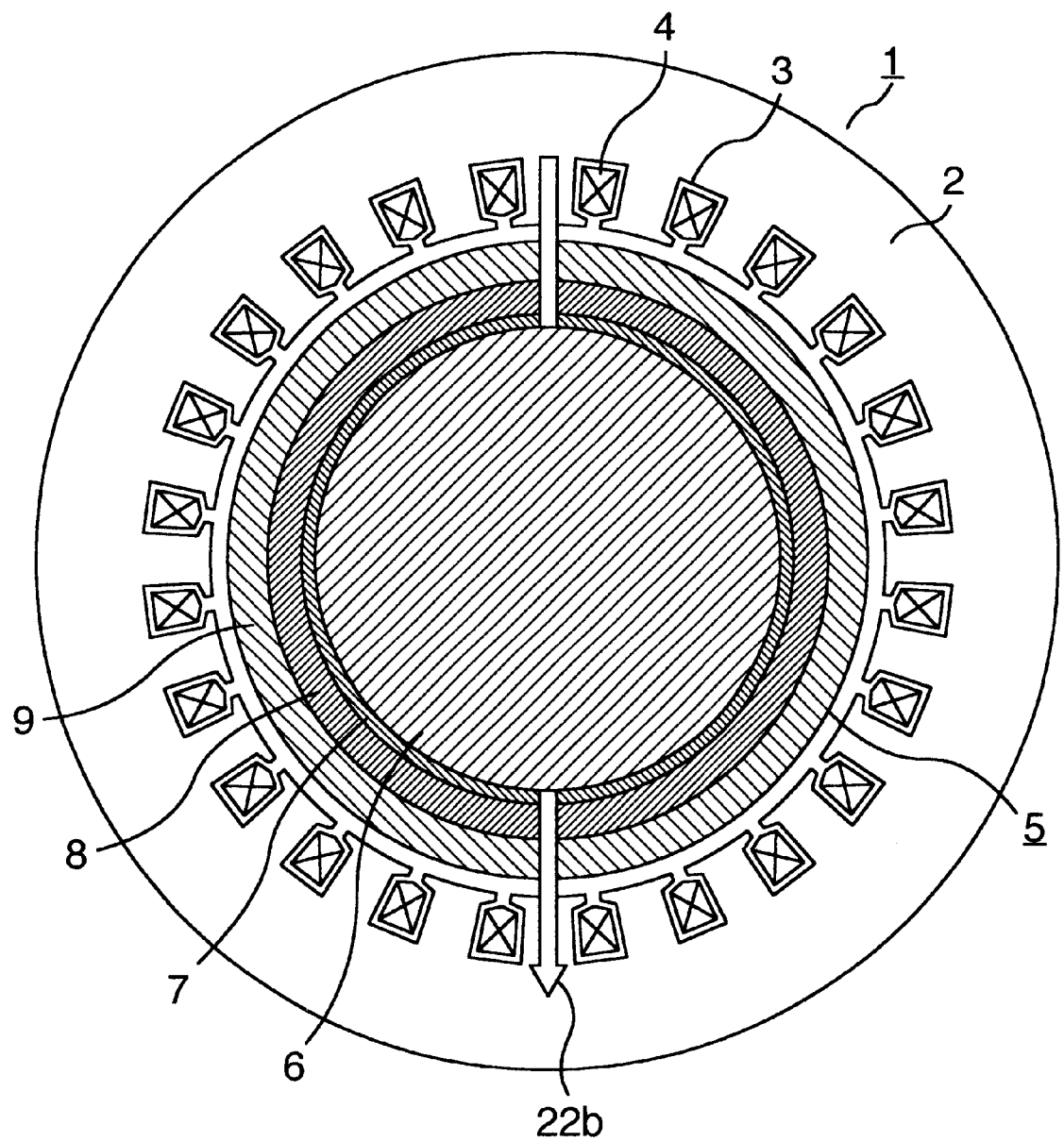
FIG. 5 is a view illustrating magnetic flux flow in the permanent magnet type synchronous motor according to the embodiment of the invention.

In contrast, the invention provides the electromagnetic steel sheet ring 7 on the outer periphery of the intermediate sleeve 10. Therefore, the harmonic magnetic flux 22 bypasses the electromagnetic steel sheet ring 7 as shown in FIG. 5, which is a view illustrating magnetic flux flow in the permanent magnet type synchronous motor according to the embodiment of the invention, so that no loss is caused in the intermediate sleeve 10, and so loss can be reduced to the sum of loss caused by the permanent magnet 8 and amounting to 10% of that total loss which would be caused without the electromagnetic steel sheet ring, and loss caused by the electromagnetic steel sheet ring 7 and amounting to several % of the total loss. Thus, it has been experimentally confirmed that the total loss caused by the rotor amounted to several hundred W. Therefore, temperature rise of the permanent magnet 8 is mitigated, and an effective magnetic flux is obtained, so that it is possible to realize a very high speed permanent magnet type synchronous motor.

While loss caused by a rotor relates to efficiency and heat generation of an associated motor, it commands whether a system is established in the case where the present very high speed permanent magnet type synchronous motor is applied to an air compressor.

Figure 6:
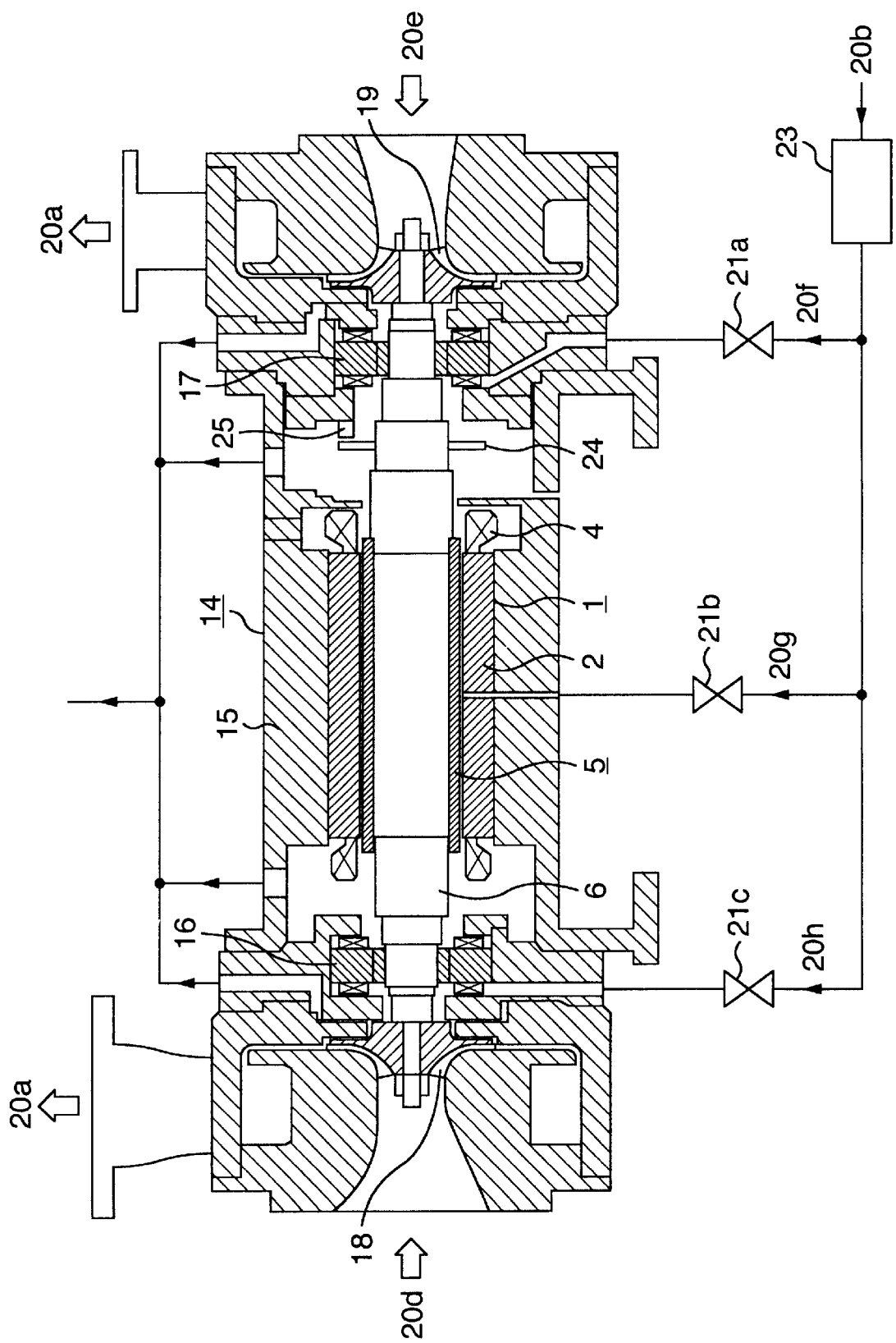
FIG. 6 is a schematic cross sectional view illustrating an air compressor, in which the embodiment shown in FIG. 1 is incorporated.

FIG. 6 shows an air compressor according to an embodiment of the invention. An air compressor 14 comprises a shaft 6 supported by magnetic bearings 16, 17 in a frame 15 (indicates an entire storage frame), a rotor 5 (composed of an intermediate sleeve 10, a permanent magnet C, a CFR 9 and a sealing material 11) fitted on the shaft 6, and a stator core 2, on which armature windings 4 are wound. During the air compression stroke, an impeller 18 provided at one end of the shaft 6 as a first compression stage compresses air 20d and discharges air 20a.

Air 20b being a part of the air 20a is cooled by an intermediate cooler 23, the resulting cooled air 20h cooling the magnetic bearing 16 through a valve 21c, the resulting cooled air 20g cooling the permanent magnet type synchronous motor 1 through a valve 21b, and the resulting cooled air 20f cooling the magnetic bearing 17 through a valve 21a, and these all cooled airs are collected and then discharged. An impeller 19 provided as a second compression stage compresses air 20e having been compressed by the impeller 18 provided as the first compressor stage (compressed air at the first compressor stage being the sum of the air 20e and the air 20b), and discharges air 20c being an output of the air compressor 14.

Here, what is important is that air being an output of the air compressor 14 is used as a cooling air for cooling the permanent magnet type synchronous motor 1. While the armature windings 4 of the permanent magnetic type synchronous motor 1 can cooled directly by the air 20g, the efficiency, at which the rotor 5 is cooled, is low. The reason for this is that since the permanent magnet type synchronous motor 1 rotates at a very high speed, an air layer rotating at a very high speed is present around the outer periphery of the rotor 5 to make it difficult to deprive the rotor 5 of heat generated therein even when the cooled air 20g is caused to blow against the rotor 5. Therefore, when loss caused by the rotor 5 is great, a quantity of the cooled air 20g cannot but be made large to amount to several tens of kW, which degrades the air compressor in efficiency.

Further, loss caused by the rotor causes the shaft 6 to effect thermal elongation. Thermal elongation of the shaft 6 on the order of mm is not allowable but limited to the order of μm since the shaft 6 is supported by the magnetic bearings 16, 17. An elongation detecting ring 6 is provided on the shaft 6, and a displacement sensor 25 is used to provide measurement of thermal elongation of the shaft 6, and it has been found that an allowable thermal elongation of the shaft 6 is up to several hundreds of μm (taking account of vibration damping effects of the magnetic bearings 16, 17).

In view of the above-mentioned matter, the applicants have clarified through various experiments the relationship between thermal elongation of the shaft 6 and harmonic current supplied from the inverter.

Table 1 shows the relationship between relative harmonic content of current and elongation percentage of the shaft in the invention. With respect to cases 1 to 7, in which a permanent magnet type synchronous motor having an output of 180 kW was used, Table 1 shows relative harmonic content of current for A: fifth order component, B: seventh order component, C: eleventh order component, D: thirteenth order component, E: seventeenth order component and F: nineteenth order component with a fundamental wave being 100%; elongation percentage of the shaft in the respective cases with an allowable elongation percentage of the shaft being 100%; total relative harmonic contents obtained by calculation with the use of formulae $(A^2+B^2+C^2+D^2+E^2+F^2)^{0.5}$; and judgement of whether A<B, A<C<B and B<10% are satisfied, in terms of characters β, X.

and A<B are excluded since they are applicable to the all cases, and A<C<B and B<10% apply only to the cases 1, 2, 3 and 7. In other words, the conditions that can realize the air compressor 14 having the very high speed permanent magnet type synchronous motor 1 as a drive source are A<C<B and B<10%; and the total content being at most 11%. To meet the condition of the total content being at most 11%, the reactor 13 is adjusted to a value of from 0.2 to 0.1 Ω. The reason for this is that in the case of at most 0.1 Ω, harmonic current becomes large to cause an increase in generation of heat, and so elongation percentage of the shaft is increased to make the air compressor unusable. In the case of at least 0.2 Ω, voltage drop of the motor becomes large, which is virtually equivalent to a state of an increase in load, so that operation becomes impossible.

Elongation attributable to centrifugal forces must be taken account when an electromagnetic steel sheet ring is applied to a very high speed permanent magnet type synchronous motor. However, when the electromagnetic steel sheet ring 7 is applied to a very high speed permanent magnet type synchronous motor 1 adapted to rotate at speed of at least 40,000 rpm according to the invention, the electromagnetic steel sheet ring 7 itself having tensile strength of at most 55 kg/mm² makes the very high speed permanent magnet type synchronous motor unavailable. In contrast, it has been confirmed through various experiments that the electromagnetic steel sheet ring 7 made of a high tensile strength electromagnetic steel sheet having tensile strength of at least 70 kg/mm² makes the very high speed permanent magnet type synchronous motor available.

TABLE 1

Relative harmonic content of current and elongation percentage in the embodiment of the Invention

| | | Case | | | | | | |
|---|---|---|---|---|---|---|---|---|
| | | 1 | 2 | 3 | 4 | 5 | 6 | 7 |
| Harmonic Order | A: 5th | 1.02 | 1.65 | 1.1 | 6.78 | 4.97 | 2.5 | 2.08 |
| | B: 7th | 5.44 | 5.73 | 5.95 | 10.21 | 8.77 | 10.46 | 9.9 |
| | C: 11th | 3.47 | 3.52 | 3.74 | 5.8 | 5.32 | 4.7 | 4.54 |
| | D: 13th | 0.33 | 0.41 | 0.37 | 0.58 | 0.49 | 1.02 | 1.05 |
| | E: 17th | 2.27 | 0.8 | 2.78 | 0.84 | 0.94 | 0.2 | 0.28 |
| | F: 19th | 2.08 | 0.87 | 2.53 | 0.67 | 0.67 | 0.92 | 1.0 |
| Shaft Elongation Percentage % | | 59 | 42 | 66 | 122 | 101 | 101 | 99 |
| Total Content % | | 7.23 | 7.04 | 8.05 | 13.61 | 11.47 | 11.82 | 11.19 |
| A < B | | ○ | ○ | ○ | ○ | ○ | ○ | ○ |
| A < C < B | | ○ | ○ | ○ | X | X | ○ | ○ |
| B < 10% | | ○ | ○ | ○ | X | ○ | X | ○ |
| External Reactor μH | | 34.72 | | 17.36 | | | 34.72 | |
| Reactance Ω | | 0.2 | | 0.1 | | | 0.2 | |
| DC Voltage V | | 653 | 540 | | | 653 | | |
| PWM Frequency Hz | | 8,250 | | | | | 2,750 | |

Here, because minute adjustment of relative harmonic content is difficult only with PWM carrier waves, an air-core reactor of electric wire was interposed and regulated between the inverter and the permanent magnet type synchronous motor. The reactor used had several tens of μH (seven kinds of electric wires having several tens of meters in length were prepared since the wire had inductance of 1 μH/m).

Table 1 shows that the shaft 1 presents an allowable value of at most 100% for elongation percentage in the case 1, case 2, case 3 and the case 7. From the above condition, it is seen that the total relative harmonic contents of at most 11.19%

Figure 7:
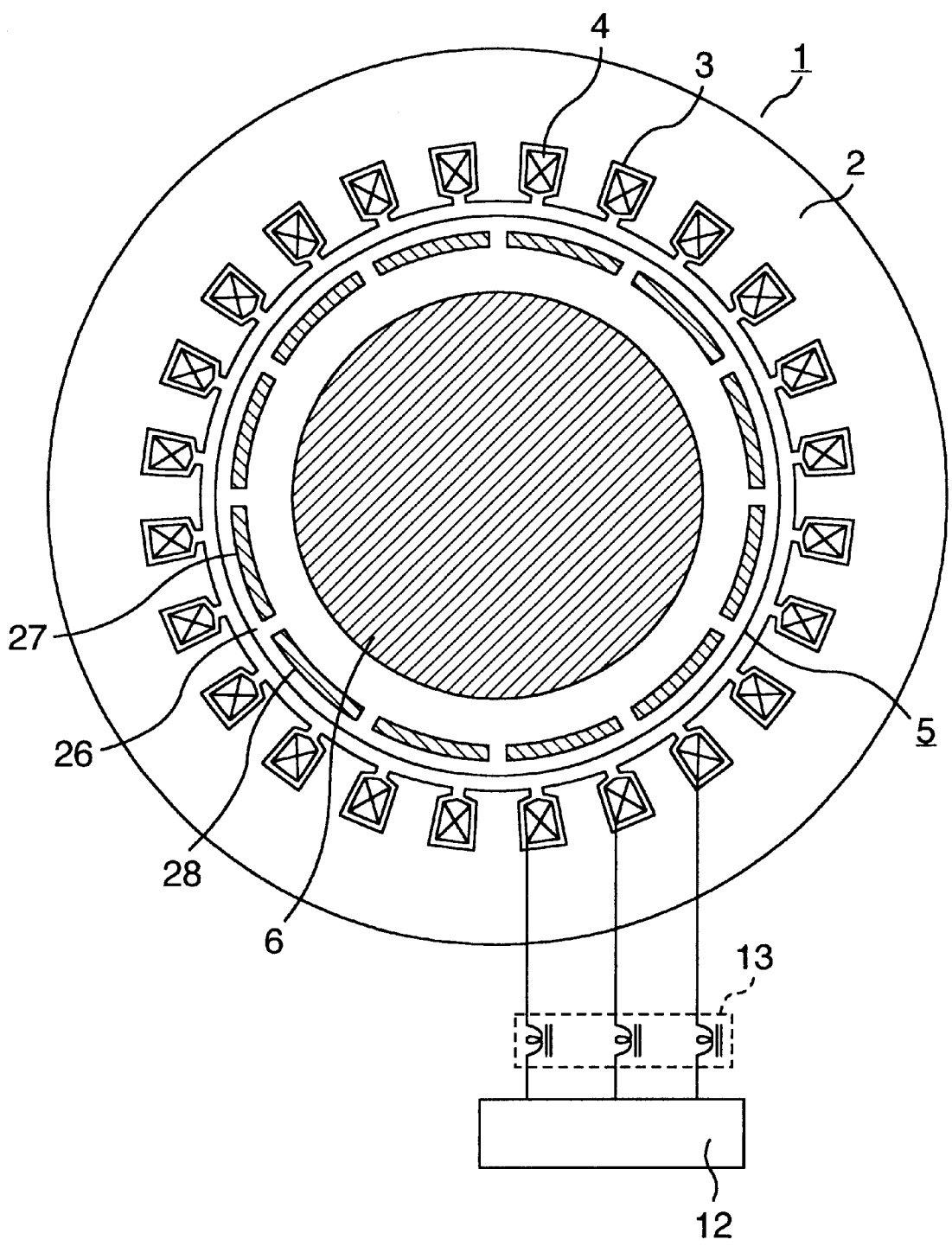
FIG. 7 is a radial, cross sectional view illustrating a permanent magnet type synchronous motor according to another embodiment of the invention.

FIG. 7 is a radial, cross sectional view illustrating a permanent magnet type synchronous motor according to another embodiment of the invention, and the same reference numerals designate the same parts as those shown in FIG. 1. The arrangement shown in FIG. 7 is different from that shown in FIG. 1 in that an electromagnetic steel sheet ring 26 is provided on the outer periphery of the shaft 6, and permanent magnets 28 are inserted in a plurality of permanent magnet insertion holes 27 formed in the electromagnetic steel sheet ring 26.

Table 2 shows the relationship between relative harmonic content of current and elongation percentage of the shaft in the embodiment shown in Table 1. While a stator being the same as that in the table 1 was also used in Table 2, reactance related to a motor constant was different in both. So, a value of an air-core reactor of electric wire was adjusted in value so as to provide reactance, which is equal to that in Table 1. With respect to cases 5 to 11, in which a permanent magnet type synchronous motor having an output of 180 kW was used, Table 2 shows relative harmonic content of current for A: fifth order component, B: seventh order component, C: eleventh order component, D: thirteenth order component, E: seventeenth order component and F: nineteenth order component with a fundamental wave being 100%; elongation percentage of the shaft in the respective cases with an allowable elongation percentage of the shaft being 100%; and total relative harmonic contents obtained by calculation with the use of formulae $(A^2+B^2+C^2+D^2+E^2+F^2)^{05}$.

high tensile strength electromagnetic steel sheet having tensile strength of at least 80 kg/mm$^2$ makes the very high speed permanent magnet type synchronous motor available even without reinforcement with the CFRP 9.

As described above in details, the invention can provide a high speed permanent magnet type synchronous motor system and an air compressor using the same because harmonic loss of neodymium magnets as well as harmonic loss of the shaft is greatly reduced and loss of the rotor can be reduced to several hundreds of W by interposing a reactor between an inverter and the permanent magnet type synchronous motor, and by adjusting content percentages of harmonic current components supplied to the permanent magnet type synchronous motor from the inverter so that a total content percentage calculated by the formula $(A^2+B^2+C^2+D^2+E^2+F^2)^{05}$ be at most a certain value where A is a

TABLE 2

Relative harmonic content of current and elongation percentage in the embodiment of the Invention

| | | Case | | | | | | |
|---|---|---|---|---|---|---|---|---|
| | | 5 | 6 | 7 | 8 | 9 | 10 | 11 |
| Harmonic | A: 5th | 4.97 | 2.5 | 2.08 | 6.96 | 10.72 | 11.38 | 12.2 |
| Order | B: 7th | 8.77 | 10.46 | 9.9 | 13.06 | 9.28 | 7.25 | 6.22 |
| | C: 11th | 5.32 | 4.7 | 4.54 | 5.25 | 2.17 | 1.55 | 1.54 |
| | D: 13th | 0.49 | 1.02 | 1.05 | 1.24 | 2.44 | 2.29 | 1.86 |
| | E: 17th | 0.94 | 0.2 | 0.28 | 1.35 | 1.34 | 1.0 | 0.73 |
| | F: 19th | 0.67 | 0.92 | 1.0 | 1.35 | 0.79 | 0.24 | 0.24 |
| Shaft Elongation Percentage % | | 56 | 56 | 52 | 130 | 102 | 94 | 91 |
| Total Content % | | 11.47 | 11.82 | 11.19 | 15.87 | 14.63 | 13.81 | 13.93 |
| External Reactor µH | | 34.72 | 34.72 | 36.9 | 0 | 0 | 0 | 0 |
| Reactance Ω | | 0.2 | 0.2 | 0.2125 | 0 | 0 | 0 | 0 |
| DC Voltage V | | | 653 | | | 567 | 540 | 513 |
| PWM Frequency Hz | | 316,500 | 5,500 | | 8,250 | | | |

Table 2 shows that the shaft presents an allowable value of at most 100% for elongation percentage in the case 5, case 6, case 7, case 10 and the case 11. From the above condition, it is seen that the above condition cannot be represented in terms of relationships among the respective harmonic orders and the total content of at most 14% applies to the above cases. In other words, the condition that can realize the air compressor 14 having the very high speed permanent magnet type synchronous motor 1, in which permanent magnets are embedded into the electromagnetic steel sheet ring, as a drive source is that the total content is at most 14%.

The reason why Table 1 and Table 2 indicate different values for elongation percentage of the shaft is that the electromagnetic steel sheet ring 26 in the arrangement shown in FIG. 7 is located on the surface of the rotor 5 to be cooled by the air 20g. Further, when the electromagnetic steel sheet ring is to be applied to the very high speed permanent magnet type synchronous motor, it is necessary to take account of elongation attributable to centrifugal forces as well as of the arrangement of the permanent magnets. However, when the electromagnetic steel sheet ring 26 is applied to a very high speed permanent magnet type synchronous motor 1 adapted to rotate at speed of at least 40,000 rpm according to the invention, the electromagnetic steel sheet ring itself having tensile strength of at most 55 kg/mm$^2$ makes the very high speed permanent magnet type synchronous motor unavailable.

In contrast, it has been confirmed through various experiments that the electromagnet steel sheet ring 26 made of a content percentage of fifth order component, B is a content percentage of seventh order component, C is a content percentage of eleventh order component, D is a content percentage of thirteenth order component, E is a content percentage of seventeenth order component and F is a content percentage of nineteenth order component in the case of a fundamental wave being 100%.

What is claimed is:

1. In a very high speed permanent magnet type electric rotating machine system comprising a permanent magnet type synchronous motor including a stator having armature windings wound in a plurality of slots formed in a stator core, and a rotor including a conductive permanent magnet provided on an outer periphery of a shaft made of a conductive magnetic material and a reinforcement material made of carbon fibers and provided on an outer periphery of the permanent magnet, and an inverter for driving the permanent magnet type synchronous motor, the improvement comprising an electromagnetic steel sheet ring provided on the outer periphery of the shaft of the rotor, and a reactor interposed between the inverter and the permanent magnet type synchronous motor, and wherein content percentages of components of harmonic current supplied to the permanent magnet type synchronous motor from the inverter are such that when a content percentage of a fundamental wave is 100%, a content percentage B of a seventh order component is at most 10% and the relationship (A<C<B) is satisfied where A is a content percentage of a fifth order component and C is a content percentage of an eleventh order component.

2. In a very high speed permanent magnet type electric rotating machine system comprising a permanent magnet type synchronous motor including a stator having armature windings wound in a plurality of slots formed in a stator core, and a rotor including a conductive permanent magnet provided on an outer periphery of a shaft made of a conductive magnetic material and a reinforcement material made of carbon fibers and provided on an outer periphery of the permanent magnet, and an inverter for driving the permanent magnet type synchronous motor, the improvement comprising an electromagnetic steel sheet ring provided on the outer periphery of the shaft of the rotor, and a reactor interposed between the inverter and the permanent magnet type synchronous motor, and wherein content percentages of components of harmonic current supplied to the permanent magnet type synchronous motor from the inverter are such that when a content percentage of a fundamental wave is 100%, a total content percentage calculated by the formula $(A^2+B^2+C^2+D^2+E^2+F^2)^{05}$ is at most 11% where A is a content percentage of a fifth order component, B is a content percentage of a seventh order component, C is a content percentage of an eleventh order component, D is a content percentage of a thirteenth order component, E is a content percentage of a seventeenth order component, and F is a content percentage of a nineteenth order component.

3. The very high speed permanent magnet type electric rotating machine system as set forth in claim 1 or 2, wherein the electromagnetic steel sheet ring is made of a high tensile strength electromagnetic steel sheet, of which tensile strength is at least 70 kg/mm$^2$.

4. In a very high speed permanent magnet type electric rotating machine system comprising a permanent magnet type synchronous motor including a stator having armature windings wound in a plurality of slots formed in a stator core, and a rotor including an electromagnetic steel sheet ring provided on an outer periphery of a shaft made of a conductive magnetic material, and conductive permanent magnets inserted into permanent magnet insertion holes in the electromagnetic steel sheet ring, and an inverter for driving the permanent magnet type synchronous motor, the improvement comprising a reactor interposed between the inverter and the permanent magnet type synchronous motor, and wherein content percentages of components of harmonic current supplied to the permanent magnet type synchronous motor from the inverter are such that when a content percentage of a fundamental wave is 100%, a total content percentage calculated by the formula $(A^2+B^2+C^2+D^2+E^2+F^2)^{05}$ is at most 14% where A is a content percentage of a fifth order component, B is a content percentage of a seventh order component, C is a content percentage of an eleventh order component, D is a content percentage of a thirteenth order component, E is a content percentage of a seventeenth order component, and F is a content percentage of a nineteenth order component.

5. The very high speed permanent magnet type electric rotating machine system as set forth in claim 4, wherein the electromagnetic steel sheet ring is made of a high tensile strength electromagnetic steel sheet, of which tensile strength is at least 80 kg/mm$^2$.

6. The very high speed permanent magnet type electric rotating machine system as set forth in any one of claims 1, 2, 4 and 5, wherein the very high speed permanent magnet type electric rotating machine system is used for an air generating source.

7. The very high speed permanent magnet type electric rotating machine system as set forth in claim 1 or 2, wherein the reactor is adjusted to a value in the range from 0.2 to 0.1 Ω so that the total content percentage becomes equal to or less than 11%.

8. The very high speed permanent magnet type electric rotating machine system as set forth in any one of claims 1, 2 and 4, wherein the very high speed permanent magnet type electric rotating machine system is a very high speed bipolar permanent magnet type electric rotating machine system operational at a rotational speed of at least 40,000 rpm.

* * * * *